United States Patent [19]

Dellinger

[11] Patent Number: 5,020,602
[45] Date of Patent: Jun. 4, 1991

[54] AERATOR FOR LAWNS AND THE LIKE

[76] Inventor: Henry P. Dellinger, P.O. Box 852, Forest Park, Ga. 30050

[21] Appl. No.: 488,947

[22] Filed: Mar. 5, 1990

[51] Int. Cl.⁵ .............................................. A01B 1/24
[52] U.S. Cl. ..................................... 172/21; 172/349; 172/556; 172/611
[58] Field of Search ............... 172/21, 177, 347, 540, 172/551, 554, 556, 611, 697, 349

[56] References Cited

U.S. PATENT DOCUMENTS

| | | | |
|---|---|---|---|
| 930,763 | 8/1909 | Jewett | 172/556 |
| 1,807,182 | 5/1931 | Stoner | 172/21 |
| 2,081,536 | 5/1937 | Gustafson | 172/611 X |
| 3,650,331 | 3/1972 | Dedoes | 172/21 |
| 3,718,192 | 2/1973 | Rogers | 172/21 X |
| 4,383,580 | 5/1983 | Huxford | 172/21 |
| 4,648,465 | 3/1987 | Jensen | 172/556 X |

FOREIGN PATENT DOCUMENTS 679253  9/1952  United Kingdom ................. 172/21
809799  3/1959  United Kingdom ................. 172/21

Primary Examiner—Dennis L. Taylor
Assistant Examiner—Jeffrey L. Thompson
Attorney, Agent, or Firm—James B. Middleton

[57] ABSTRACT

An aerator for lawns and the like has spiders formed of four identically formed members. Each member has a tine on each end, so four members provide eight tines for the spider. The members are relatively narrow, and filler members at each side of the tine members provide stability to the spider. The spiders are carried by a frame, and the frame carries a weight-receiving tray for carrying weight to assure penetration of the tines. Springs carry the tray on the frame so the springs will absorb the energy if the tines engage an impenetrable object.

8 Claims, 2 Drawing Sheets

U.S. Patent	June 4, 1991	Sheet 1 of 2	5,020,602
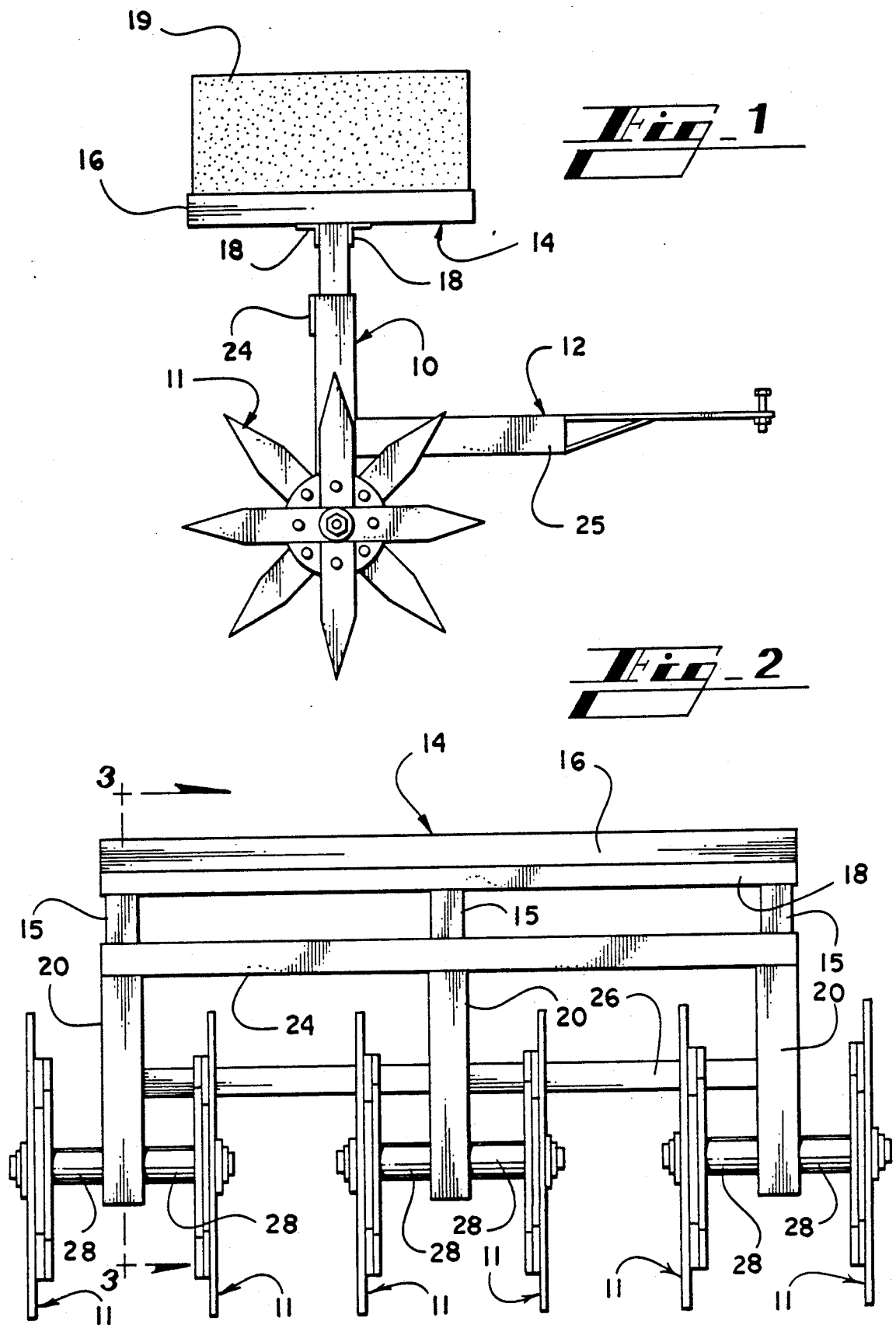

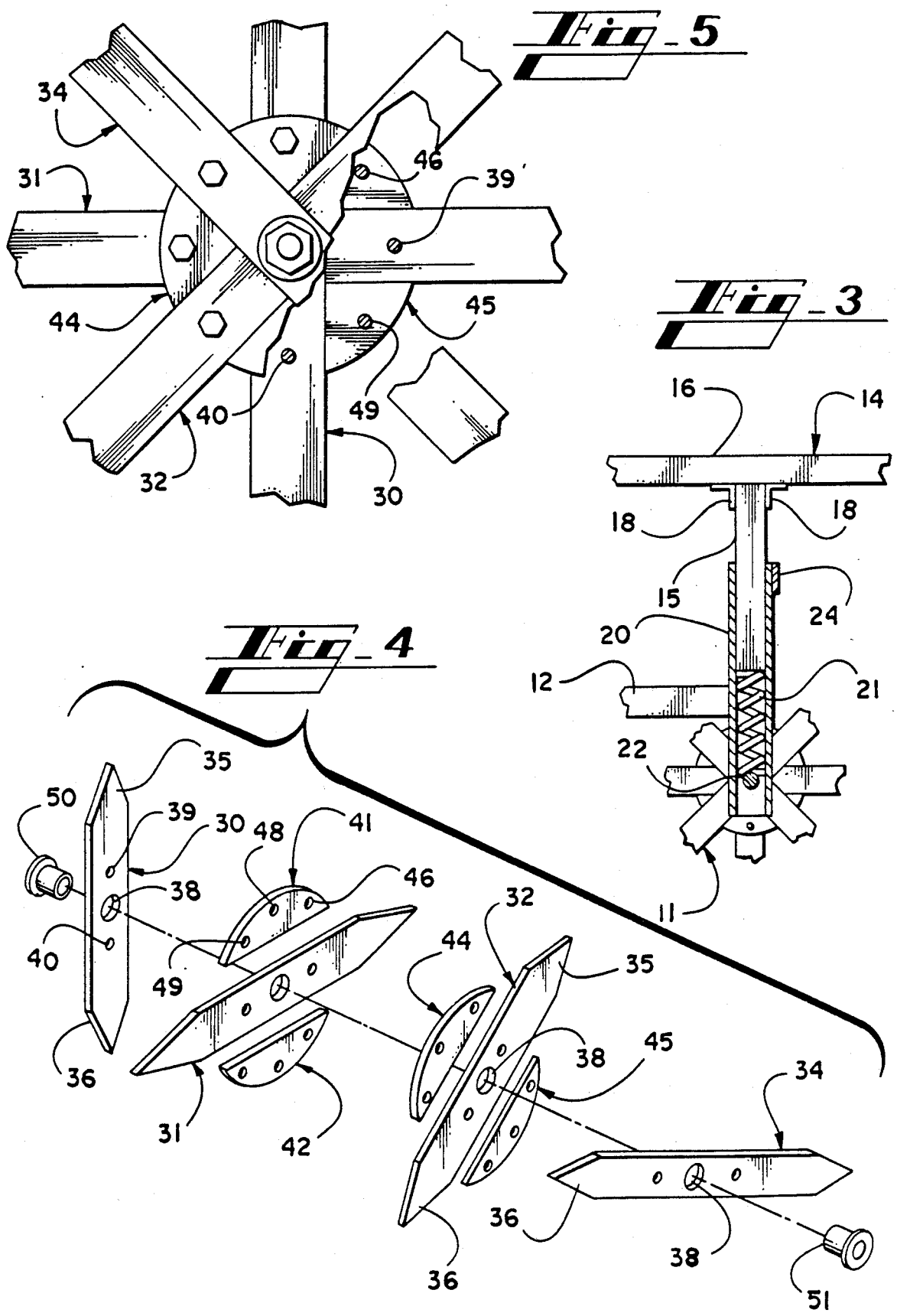

AERATOR FOR LAWNS AND THE LIKE

INFORMATION DISCLOSURE STATEMENT

It is well known to be beneficial to lawns and the like to utilize some means for aerating the soil. The usual aerator includes a plurality of tines to penetrate the soil so as to open the soil to allow water and air more fully to contact the dirt and the roots of growing plants. The prior art includes a large number of aerators, and the prior art device usually comprises a drum having a plurality of fingers, or tines, extending therefrom. As the drum moves along the surface, the tines penetrate the soil. With such a unitary device, it will be obvious that, if a tine breaks off, the tine must be welded back to the drum, or the entire drum must be replaced. Also, in drum type aerators, the tines tend to be rather short so the drum itself contacts the soil, and packs the soil. This defeats the very purpose of the aerator. Other aerators include separate wheels having a plurality of tines. Again, the wheels are usually integrally formed so that, if one tine is broken, the entire wheel must be replaced. Whether a single drum or separate wheels, the prior art aerators all have tines fixed to rotate together, so if one tine is stopped, the entire device is stopped.

To obtain the desired soil penetration, it is customary to weight the aerator, usually with stones or the like. While the addition of weight does produce the penetration, the weight causes great damage when the aerator engages a large stone or other impenetrable object. With the aerator traversing the ground at some reasonable speed, and some weight on the aerator to cause penetration of the soil, it will be understood that anything that suddenly stops one or more tines causes the force of the moving weight to be applied to the tines. Such force will be very great, and will usually be sufficient to bend or break a tine, or a wheel, or perhaps a frame member.

Thus, the prior art does not include a truly efficient aerator that is easy and efficient to use and to maintain.

SUMMARY OF THE INVENTION

This invention relates generally to agricultural equipment, and is more particularly concerned with an aerator for domestic use on lawns and the like.

The present invention provides an aerator having a plurality of separate wheels, or spiders, thereon, each separate wheel being rotatable independently of the others. Thus, any one wheel can be stopped, and the other wheels can continue to rotate as usual. Further, each wheel is formed of a plurality of identical pieces, so that one piece can be replaced in the event a tine is damaged, without replacing an entire wheel, and without requiring welding or other special machining techniques.

In the preferred embodiment of the present invention, there is a weight-carrying tray, and the weight-carrying tray is resiliently supported by the aerator's main frame. As a result, if a tine engages a large rock or the like, the spider can move up, against spring tension, without causing the entire force of the moving weights to be exerted against the tine.

BRIEF DESCRIPTION OF THE DRAWINGS

These and other features and advantages of the present invention will become apparent from consideration of the following specification when taken in conjunction with the accompanying drawings in which:

FIG. 1 is a side elevational view of an aerator made in accordance with the present invention;

FIG. 2 is a rear elevational view of the device shown in FIG. 1;

FIG. 3 is a cross-sectional view taken substantially along the line 3—3 in FIG. 2;

FIG. 4 is an exploded perspective view showing construction of a spider in accordance with the present invention; and, FIG. 5 is an enlarged, fragmentary, side elevation of a spider made in accordance with the present invention.

DETAILED DESCRIPTION OF THE EMBODIMENT

Referring now more particularly to the drawings, and to that embodiment of the invention here presented by way of illustration, the aerator shown in FIG. 1 includes a frame 10 carrying a plurality of wheels, or spiders, 11. The frame 10 includes a tongue 12 extending forwardly therefrom for connecting the aerator to a lawn or garden tractor, or similar device.

Above the frame 10, there is a weight-carrying tray generally designated at 14. The weight-carrying tray 14 includes a plurality of vertical supports 15, and a generally rectangular tray 16. With attention to FIGS. 1–3, it will be seen that the tray 16 is simply a frame formed of angle iron, with a flange of the angle iron extending inward. Longitudinal members 18 provide means for connecting the vertical supports 15 and for lending strength to the tray.

As is illustrated in FIG. 1, it is contemplated that the weight-carrying tray 14 will be dimensioned to receive standard size concrete blocks such as the block 19. Preferably, the length of the tray, from front to rear, will be such as just to receive the length of a concrete block. The width of the tray, as shown in FIG. 2, will preferably be an even multiple of the width of a concrete block.

It will be obvious to those skilled in the art that many different heavy items may be used to provide the desired weight on the aerator. As is well known, bags of stones may be used, or any aggregate of metal plates or any large object that will be supported by the tray 14. Alternatively, a floor can be provided for the tray 14, and a plurality of smaller objects can be placed on this floor for weighting the aerator. Nevertheless, when it is considered that the present invention is intended primarily to be used in an urban setting, it will be realized that the usual farm debris will not be available to the user, but concrete blocks are commonly available in urban areas. With the arrangement described, a plurality of concrete blocks can be used as weight, and no adaptation is required to have a stable device for aerating lawns and the like.

Attention is directed to FIG. 3 of the drawings, where it will be seen that the vertical supports 15 of the weight-carrying tray 14 are slidably received in standards 20 of the frame 10. Within the standards 20, there are springs, such as the spring 21, extending between the axle 22 and the vertical support 15. Thus, if a spider 11 engages a large rock or the like and suddenly moves up, the movement will cause the spring 21 to be compressed since the inertia of the weight-carrying tray will offer a considerable amount of resistance to sudden motion of the tray. The springs 21 will therefore absorb a great amount of energy and prevent damage to the wheels and frame of the aerator.

FIG. 2 shows the construction of the frame 10 of the aerator of the present invention. As here shown, there are three of the standards 20, though of course different numbers may be used for larger or smaller aerators. The standards are connected together by a strap 24 across the rear of the standards. Each of the standards is also connected to the tongue 12, there being a forwardly extending piece 25 fixed to each of the standards 20. The three pieces 25 are then connected by the transverse member 26. Thus, the pulling force is applied close to the axis of the spiders 11.

The lowermost end of each of the standards 20 carries two spiders 11. As is shown in FIG. 2, there are spacers 28 on each side of the standard 30. The spacers 28 separate the two spiders carried by one standard; and, the spiders carried by the adjacent standard are so spaced as to provide generally uniform spacing of the spiders across the aerator.

The construction of the individual spiders 11 is unique, and this construction is shown in FIGS. 4 and 5 of the drawings. Each of the spiders is made up of four tine members 30, 31, 32 and 34, all of the tine members being substantially identical, so a large number of tine members can be made, and a plurality of spiders can be assembled from the tine members without concern for matching, pairing or the like.

Because all the tine members 30-34 are alike, only one will be described in detail, and the same reference numerals will be used for the same parts on other tine members. Thus, taking the tine member 30 by way of example, the tine member 30 has tines 35 and 36 at the opposite ends thereof. Centrally of the member 30, there is a hole 38 for receiving the axle 22; and, on each side of the hole 38, towards the tines 35 and 36, there are screw holes 39 and 40. The purpose of the screw holes will become apparent later.

In addition to the four tine members in the spiders 11, there are four filler members designated at 41, 42, 44 and 45. All of the filler members are alike, and member 41 will be described as an example. It will be noticed that the filler member 41 is shaped as a segment of a circle, somewhat less than a semicircle. The thickness of the member 41 is the same as the thickness of the tine member 30. The filler member 41 defines a plurality of screw holes 46, 48 and 49, the holes lying on radii of the circle of which the filler member 41 is a segment.

With the description of the parts in mind, the assembly and final construction of the spider 11 should be understandable. Looking at FIGS. 4 and 5 it will be seen that the tine member 30 is generally vertically oriented, and the next tine member 31 is generally horizontal. The next member 32 is then placed at 45°, and the last member 34 is perpendicular to the member 32 and at 45° to the other members. Considering the tines 35 and 36 at each end of the tine members, it will be realized that the spider 11 will have tines every 45° around the spider.

The tine members 30-34 are rather narrow, perhaps around one and one-half inches or so. With these rather narrow pieces crossing only at their center portions, the resulting structure would not be very stable. To resolve that difficulty, the filler members 41-45 are provided. It will be seen from FIG. 4 that filler members 41 and 42 are placed at each side of the tine member 31. The filler members 41 and 42 are segments of a circle, and the circle has its center at the center of the hole 38. The screw holes 46, 48 and 49 are then on radii centered on the hole 38 and spaced apart by 45°.

The filler members 44 and 45 are placed at the sides of the tine member 32 as described for the tine member 31. The result is that these tine members 31 and 32, at 45° with respect to each other, effectively have circular center portions. The assembly is then held together by a plurality of screws placed every 45° through the screw holes. The filler members 41–45 therefore provide stability for the tine members 30–34, and screws through the assembly render the assembly quite sturdy.

With the spider 11 assembled as discussed above, it will be understood that the central holes 38 will be aligned to provide a bearing, or axle, hole through the spider 11. A bearing, such as the bearings 50 and 51, can be placed in each end of the central hole; then, and axle can be received through the bearings 50 and 51 and the central hole. It is contemplated that ball or roller bearings will be used as the bearings 50 and 51, but other types of bearings can be used if desired.

With the construction of the spiders 11 as discussed above, it will readily be seen that each spider 11 will rotate easily on the axle 22, so that each of the spiders 11 will rotate independently of all the others. If one spider is caused to stop rotating for any reason, all the others are still free to rotate independently. Also, when the aerator of the present invention turns a corner, each spider can rotate at its own speed which eliminates much stress, and prevents the additional disturbance of soil that would occur if all spiders were forced to rotate at the same speed.

In the event one spider, or one tine, becomes bent or otherwise damaged, the one tine member may be replaced, or one entire spider can be replaced. As was mentioned previously, the spiders 11 include only two major components—the tine members and the filler members—and these two components can be mass manufactured for assembly of a plurality of spiders.

Due to the construction of the present device, it will be understood that the aerator of the present invention is very flexible, and is adaptable to many different conditions. With one frame, the number and location of the spiders is variable to vary the width of the device, or to allow a space so the device can straddle a crop or the like. Those skilled in the art will be able to adapt the device for many varied tasks by devising many configurations of the aerator described.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. An aerator for lawns, said aerator including a plurality of standards, means for connecting said plurality of standards to one another, and a tray carried by said standards, said tray being adapted for receiving weights thereon, spring means for resiliently supporting said tray with respect to said standards, and a plurality of spiders for rolling over the ground to be aerated, said plurality of spiders being carried by said plurality of standards, said tray including a plurality of vertical supports, each of said plurality of vertical supports being slidably received within one of said standards, said spring means including a coil spring within each of said standards below said vertical support.

2. An aerator as claimed in claim 1, and further including a tongue connected to said standards, said tongue including means for connecting said tongue to a tractor.

3. An aerator as claimed in claim 2, two spiders of said plurality of spiders being carried by each standard of said plurality of standards, said aerator further including a plurality of axles, each axle of said plurality of axles passing laterally through one standard of said plurality of standards, spacing means on each side of said standard concentric with said axle, said spiders being received on said axles, the arrangement being such that said spiders are carried by said standards and spaced from said standards by said spacing means, each spider being independently rotatable on said axle.

4. An aerator as claimed in claim 3, wherein said tray is generally rectangular and has one dimension substantially equal to the length of a concrete block, and the other dimension a substantially even multiple of the width of a concrete block.

5. An aerator for lawns, said aerator including a plurality of standards, means for connecting said plurality of standards to one another, and a plurality of spiders for rolling over the ground to be aerated, said plurality of spiders being carried by said plurality of standards, each spider of said plurality of spiders comprising a plurality of identically formed tine members, each tine member of said plurality of tine members including a tine on each end thereof and being angularly offset with respect to the other tine members of said spider, said spider further including a plurality of filler members, at least one tine member of said plurality of tine members having one filler member on each side thereof, and a plurality of fastening means passing through at least some of said tine members and at least some of said filler members, each tine member of said plurality of tine members defining a central hole therein, the arrangement being such that, when said plurality of tine members is stacked to form said spider, said central holes are aligned for defining an axle receiving hole, and further including a tray carried by said standards, said tray being adapted for receiving weights thereon, and spring means for resiliently supporting said tray with respect to said standards, said tray including a plurality of vertical supports, each of said plurality of vertical supports being slidably received within one of said standards, said spring means including coil springs within said standards below said vertical support.

6. An aerator as claimed in claim 5, and further including a tongue connected to said standards, said tongue including means for connecting said tongue to a tractor.

7. An aerator as claimed in claim 6, two spiders of said plurality of spiders being carried by each standard of said plurality of standards, said aerator further including a plurality of axles, each axle of said plurality of axles passing laterally through one standard of said plurality of standards, spacing means on each side of said standard concentric with said axle, said spiders being received on said axles, the arrangement being such that said spiders are carried by said standards and spaced from said standards by said spacing means, each spider being independently rotatable on said axle.

8. An aerator as claimed in claim 7, wherein said tray is generally rectangular and has one dimension substantially equal to the length of a concrete block, and the other dimension a substantially even multiple of the width of a concrete block.

* * * * *